(12) United States Patent
Ogura

(10) Patent No.: US 11,676,394 B2
(45) Date of Patent: Jun. 13, 2023

(54) PROCESSING DEVICE FOR CONVERSION OF IMAGES

(71) Applicant: KOITO MANUFACTURING CO., LTD., Tokyo (JP)

(72) Inventor: Ryota Ogura, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/061,662

(22) Filed: Oct. 2, 2020

(65) Prior Publication Data

US 2021/0027102 A1 Jan. 28, 2021

Related U.S. Application Data

(63) Continuation of application No. PCT/JP2019/014890, filed on Apr. 3, 2019.

(30) Foreign Application Priority Data

Apr. 5, 2018 (JP) .............................. JP2018-073354

(51) Int. Cl.
*G06V 20/56* (2022.01)
*G06F 18/214* (2023.01)
*G06V 10/77* (2022.01)
*B60Q 1/00* (2006.01)
*H04N 23/80* (2023.01)
*G05D 1/02* (2020.01)

(52) U.S. Cl.
CPC .......... *G06V 20/56* (2022.01); *B60Q 1/0023* (2013.01); *G06F 18/214* (2023.01); *G06V 10/7715* (2022.01); *H04N 23/80* (2023.01); *G05D 1/0231* (2013.01)

(58) Field of Classification Search
None
See application file for complete search history.

(56) References Cited

U.S. PATENT DOCUMENTS

| | | | |
|---|---|---|---|
| 2017/0075356 A1* | 3/2017 | Delp | G05D 1/0242 |
| 2018/0232606 A1* | 8/2018 | Park | G06K 9/66 |
| 2019/0244060 A1* | 8/2019 | Dundar | G06V 10/764 |
| 2020/0065619 A1 | 2/2020 | Liu et al. | |
| 2021/0027102 A1* | 1/2021 | Ogura | G06K 9/36 |

FOREIGN PATENT DOCUMENTS

| | | |
|---|---|---|
| CN | 107767408 A | 3/2018 |
| EP | 3171292 A1 | 5/2017 |

(Continued)

OTHER PUBLICATIONS

International Search Report (Form PCT/ISA/210) dated Jun. 25, 2019, in corresponding International Application No. PCT/JP2019/014890. (3 pages).

(Continued)

*Primary Examiner* — Tahmina N Ansari
(74) *Attorney, Agent, or Firm* — Buchanan Ingersoll & Rooney PC

(57) ABSTRACT

A processing unit recognizes an object based on image data. An object recognition unit identifies the object based on the image data. A conversion unit is configured as a neural network provided as an upstream stage of the object recognition unit. The conversion unit converts a first image IMG acquired by the camera into a second image, and inputs the second image to the object recognition unit.

10 Claims, 5 Drawing Sheets

(56) References Cited

FOREIGN PATENT DOCUMENTS

| | | |
|---|---|---|
| JP | H05127698 A | 5/1993 |
| JP | H11-275376 A | 10/1999 |
| JP | 2008-105518 A | 5/2008 |
| JP | 2009-017157 A | 1/2009 |
| JP | 2009-098023 A | 5/2009 |
| JP | 2017-056935 A | 3/2017 |
| JP | 2017-533482 A | 11/2017 |

OTHER PUBLICATIONS

International Preliminary Report on Patentability (Form PCT/IB/373) and the Written Opinion of the International Searching Authority (Form PCT/ISA/237) dated Oct. 6, 2020, in corresponding International Application No. PCT/JP2019/014890. (14 pages).
Supplementary European Search Report dated Apr. 30, 2021, issued by the European Patent Office in corresponding European Application No. 19781869.3. (9 pages).
Liu et al., "Unsupervised Image-to-Image Translation Networks", Feb. 15, 2018, pp. 1-11, XP055793210, arXiv.org Retrieved from the Internet: URL:https://arxiv.org/pdf/1703.00848v5.pdf.
Zhu et al., "Toward Multimodal Image-to-Image Translation", arxiv.org, Cornell University Library, 201 Olin Library Cornell University Ithaca, NY 14853, 30 Nov. 30, 2017, XP081419959. (2 pages).
Office Action (Notice of Reasons for Refusal) dated Dec. 20, 2022, in corresponding Japanese Patent Application No. 2020-512308 and English translation of the Office Action. (5 pages).

\* cited by examiner

IMG1

IMG3

IMG2

IMG_DAY

IMG_NIGHT

PROCESSING DEVICE FOR CONVERSION OF IMAGES

BACKGROUND

1. Technical Field

The present disclosure relates to an object identification system.

2. Description of the Related Art

Object recognition is a very important architecture in autonomous driving. An object recognition system is configured including a sensor and a processing device configured as a neural network that processes the output of the sensor. Examples of candidates for such a sensor include cameras, Light Detection and Ranging, Laser Imaging Detection and Ranging (LiDAR), millimeter-wave radar, ultrasonic sonar, and so forth. From among such sensor candidates, a high-resolution camera is commercially available for the lowest cost. Such cameras have been becoming popular for mounting on a vehicle.

The processing device for processing an output image of a camera is configured as a convolutional neural network (CNN). The CNN is subjected to learning (training) using images acquired for various scenes.

An in-vehicle object recognition system is required to operate even in the nighttime with the same precision as that in the daytime. However, in the nighttime, sunlight cannot be used. Instead, the camera acquires an image using the reflected light from the headlamps of the user's vehicle. Accordingly, an object at a shorter distance from the user's vehicle appears brighter, and an object at a longer distance appears darker, which results in the acquisition of an image that is completely different from an image that is acquired in the daytime. Furthermore, in the nighttime, automobiles have headlamps and taillamps in the lighting-on state, leading to features that differ from those in the daytime.

In a case in which only images acquired in a daytime scene are used as the learning data, this leads to a degraded identification rate for an object included in an image acquired in a nighttime scene. In a case in which, in addition to using images acquired in the daytime, images acquired in a nighttime scene are used as the learning data, such a problem is mitigated to some extent. However, such an arrangement requires image data acquired in the nighttime, leading to an increase in costs required for the training. In addition, it cannot be anticipated to greatly improve the identification rate with respect to a distant object which is reached by only a small amount of light.

SUMMARY

The present disclosure has been made in such a situation.

An embodiment of the present disclosure relates to a processing device structured to recognize an object based on image data. The processing device includes: an object recognition unit structured to identify an object based on the image data; and a conversion unit structured as a neural network provided as an upstream stage of the object recognition unit, and structured to convert a first image acquired by a camera into a second image, and to input the second image to the object recognition unit.

Another embodiment of the present disclosure relates to a processing device structured to recognize an object based on a sensor output acquired by a sensor. The processing device includes: a conversion unit structured as a neural network, and structured to convert the sensor output to intermediate data; and an object recognition unit structured to identify an object based on the intermediate data. The conversion unit converts the sensor output into the intermediate data as acquired in the same environment as that in which learning data used for training of the object recognition unit was acquired.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Overview of the Embodiments

Figure 1:
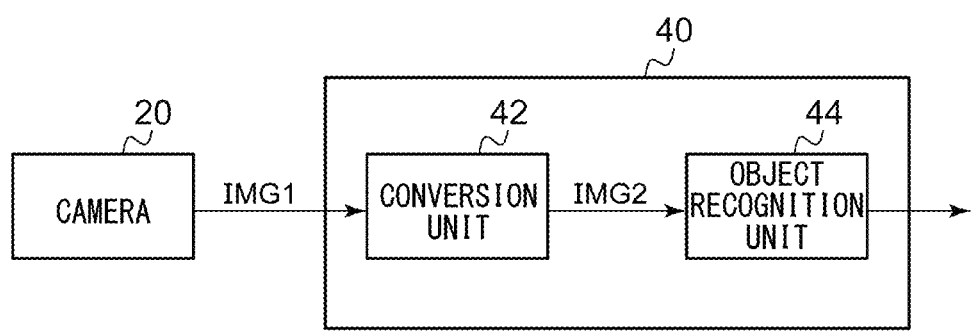
FIG. 1 is a diagram showing an object identification system according to an embodiment.

An outline of several example embodiments of the disclosure follows. This outline is provided for the convenience of the reader to provide a basic understanding of such embodiments and does not wholly define the breadth of the disclosure. This outline is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

One embodiment disclosed in the present specification relates to a processing device. The processing device is structured to recognize an object based on image data. The processing device includes: an object recognition unit structured to identify an object based on the image data; and a conversion unit structured as a neural network provided as an upstream stage of the object recognition unit, and structured to convert a first image acquired by a camera into a second image, and to input the second image to the object recognition unit. By providing such an image having shades suitable as the input of the object recognition unit, this arrangement allows the identification rate to be improved.

Also, the second image may be obtained by correcting the shades of the first image such that they are an approximation of learning data used for training of the object recognition unit. In a case in which such an image that is an approximation of the learning data is input to the object recognition unit, this arrangement allows the identification rate to be improved.

In the training of the neural network of the conversion unit, the conversion unit may be trained with reference to the recognition rate of the object recognition unit so as to improve the recognition rate.

Also, the second image may be generated as an image of the same scene as that of the first image, as acquired in the same environment as an environment in which the learning data used for the training of the object recognition unit was acquired.

Also, the learning data may be acquired in daytime. Also, the conversion unit may convert a first image acquired in nighttime into a second image as acquired in daytime.

Also, the conversion unit may receive multiple consecutive frames as input. In a case in which multiple consecutive frames are input, this arrangement allows the conversion unit to provide conversion processing based on features that change over time.

One embodiment of the present disclosure relates to a processing device structured to recognize an object based on the sensor output acquired by a sensor. The sensor may be configured as a distant measurement sensor (three-dimensional sensor) such as a LiDAR, TOF sensor, or the like. The processing device includes: a conversion unit structured as a neural network, and structured to convert the sensor output to intermediate data; and an object recognition unit structured to identify an object based on the intermediate data. The conversion unit converts the sensor output into the intermediate data as acquired in the same environment as that in which learning data used for training of the object recognition unit was acquired. For example, rainy weather or dense fog degrades the precision of the distance measurement sensor. The conversion unit compensates for the degraded precision. That is to say, the conversion unit supplies intermediate data as acquired in clear weather to the object recognition unit, thereby providing an improved identification rate.

Embodiment

Description will be made below regarding the present disclosure based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present disclosure. Also, it is not necessarily essential for the present disclosure that all the features or a combination thereof be provided as described in the embodiments.

FIG. 1 is a diagram showing an object identification system 10 according to an embodiment. The object identification system 10 is mounted on a vehicle as described later, and can be used for autonomous driving or a light distribution control operation of headlamps. However, the usage is not restricted. At least a part of the following description of the present embodiment will be made assuming that the object identification system 10 is mounted on a vehicle.

The object identification system 10 includes a camera 20 and a processing unit 40. The camera 20 is configured as an image sensor such as a Complementary Metal Oxide Semiconductor (CMOS) sensor, a Charge Coupled Device (CCD), or the like. The camera 20 outputs image data (first image) IMG1 at a predetermined frame rate.

The processing unit 40 recognizes an object based on the image data IMG1. Specifically, the processing unit 40 judges the position and the category of an object included in the image data IMG1. The processing unit 40 is configured as a combination of a processor (hardware component) such as a Central Processing Unit (CPU), Graphics Processing Unit (GPU), microcontroller, or the like, and a software program to be executed by the processor (hardware component).

Also, the processing unit 40 may be configured as a combination of multiple processors. For example, examples of the category of the object include a pedestrian, bicycle, automobile, pole, and the like. Regarding a pedestrian, a pedestrian as viewed from the front, a pedestrian as viewed from the rear, and a pedestrian as viewed from the side may be defined as the same category of object. The same can be said of an automobile and bicycle.

The processing unit 40 includes a conversion unit 42 and an object recognition unit 44. The object recognition unit 44 employs an algorithm for a convolutional neural network using deep learning techniques. As such an algorithm, FasterRCNN may be employed. However, the present disclosure is not restricted to such an arrangement. Examples of algorithms that can be employed include You Only Look Once (YOLO), Single Shot MultiBox Detector (SSD), Region-based Convolutional Neural Network (R-CNN), Spatial Pyramid Pooling (SPPnet), Mask R-CNN, etc. Also, other algorithms that will be developed in the future may be employed.

The conversion unit 42 is configured as a neural network provided as an upstream stage (previous stage) of the object recognition unit 44. The conversion unit 42 converts the first image IMG1 acquired by the camera 20 into a second image IMG2, and inputs the second image IMG2 to the object recognition unit 44.

Figure 2:
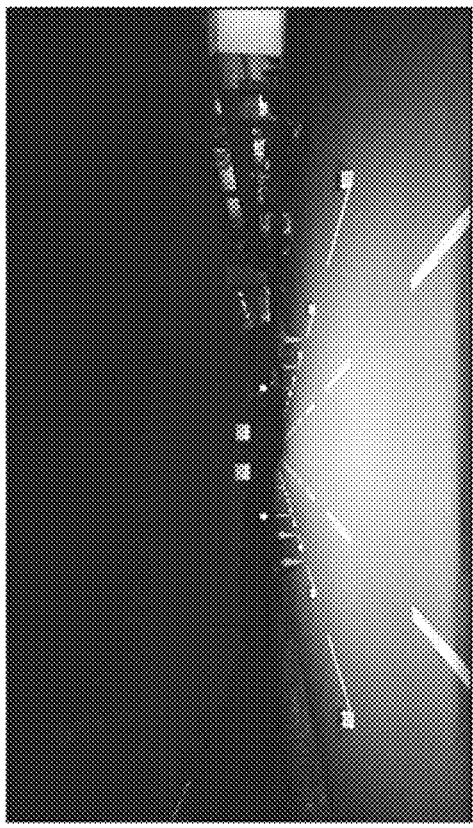
FIG. 2 is a diagram for explaining conversion processing supported by a conversion unit.
Figure 2:
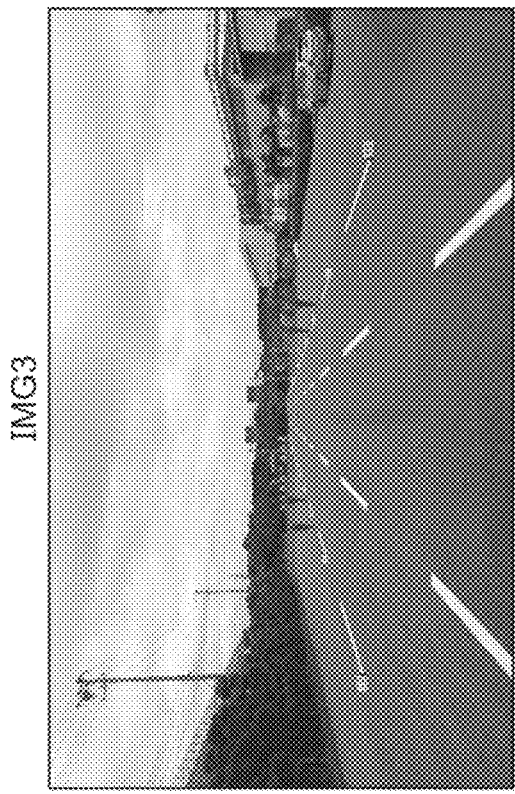
Figure 2:
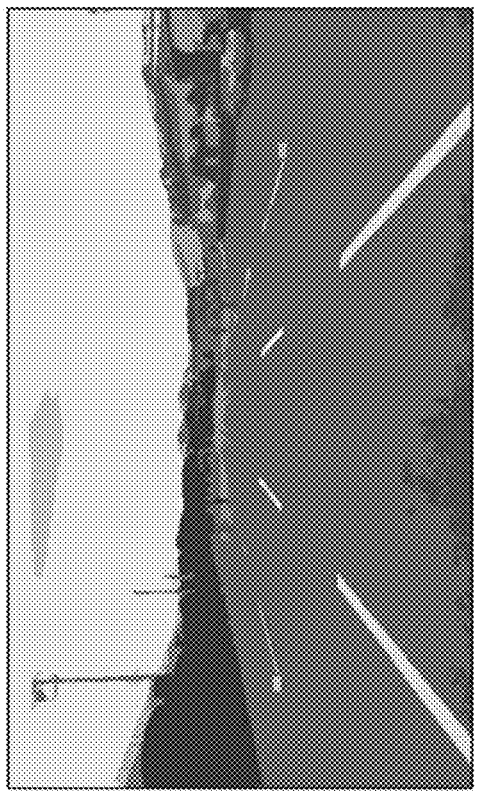

Description will be made regarding the conversion supported by the conversion unit 42. FIG. 2 is a diagram for explaining the conversion processing supported by the conversion unit 42. The object recognition unit 44 is trained using the image data IMG3 (learning data) acquired under a given environment (which is referred to as a "standard environment"). Typically, as the learning data IMG3, images of various scenes (urban area, highway, clear weather, cloudy weather, rainy weather) acquired in daytime are used. In this example, as the standard environment, the daytime environment is employed.

However, in some cases, there is a large difference between the standard environment and an environment (which will be referred to as an "actual environment") in which the second image IMG2 is acquired. Most typical examples thereof include a case in which the actual environment is a nighttime environment. In this case, there is a large difference between the second image IMG2 and the learning data IMG3. The conversion unit 42 converts the first image IMG1 into the second image IMG2 so as to reduce the difference between them. The second image IMG2 thus converted is an approximation of the learning data IMG3. More specifically, the conversion unit 42 corrects the first image IMG1 such that its shades approximate those of the learning data IMG3, so as to generate the second image IMG2.

That is to say, the second image IMG2 becomes an approximation of an image of the same scene as that of the first image IMG1, as acquired in the standard environment in which the learning data IMG3 used in the training of the object recognition unit 44 was acquired. Description will be made below regarding an example with the daytime environment as the standard environment and with the nighttime environment as the actual environment.

Examples of known related techniques include a technique for converting a monochrome image into a color image using the deep network technique (S. Iizuka, E. Simo-Serra, H. Ishikawa, "Automatic Coloring of Monochrome Images Using Learning of Global Features and Local Features Using Deep Networks", [online], Internet URL:http://hi.cs.waseda.ac.jp/~iizuka/projects/colorization/ ja/). The conversion unit 42 employs a somewhat simpler mechanism as compared with the related technique described above. That is to say, the conversion unit 42 is configured to adjust the shades (contrast or brightness levels) without maintaining the color so as to reproduce the image as acquired in the daytime. The conversion unit 42 having such a function can be designed using known algorithms, which will be clearly understood by those skilled in this art.

The conversion unit 42 may adjust the brightness or contrast for each pixel, for each area, or for the entire area in a uniform manner.

Figure 3:
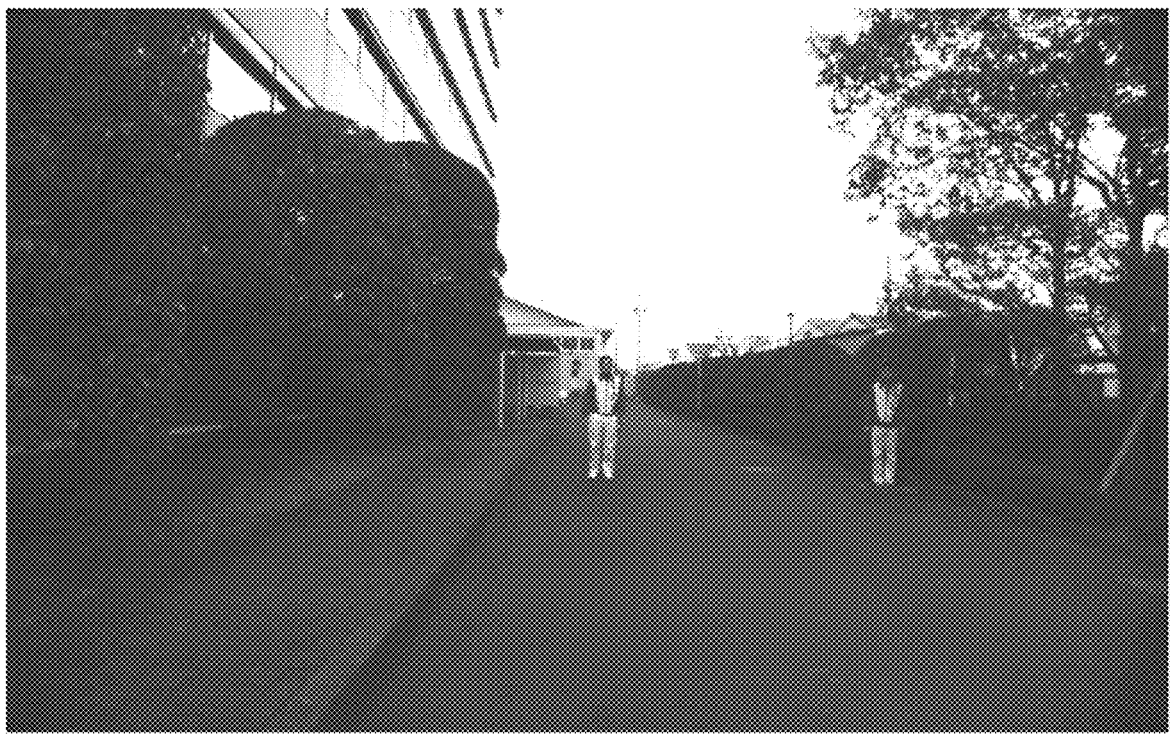
FIG. 3 is a diagram showing an example of an image used for training of the conversion unit.
Figure 3:

FIG. 3 is a diagram showing an example of images to be used for the training of the conversion unit 42. FIG. 3 shows an image IMG_DAY of a scene acquired in the daytime and an image IMG_NIGHT of the same scene acquired in the nighttime. By inputting a great number of such pairs of two images to the conversion unit 42, such an arrangement is capable of constructing a neural network that is capable of converting an image acquired in the nighttime into an image as acquired in the daytime.

Figure 4:
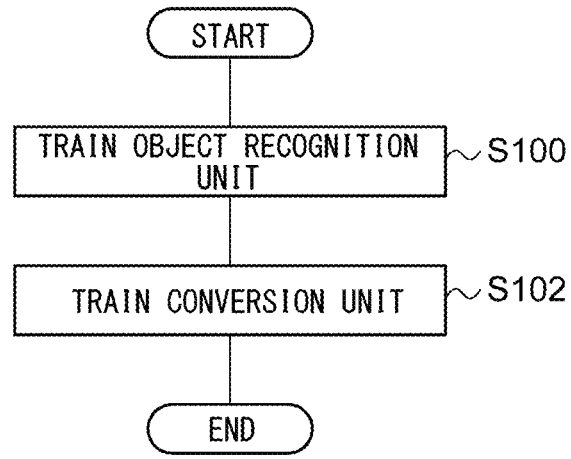
FIG. 4 is a flowchart showing a learning operation of a processing device.

FIG. 4 is a flowchart showing the training operation of the processing unit 40. The object recognition unit 44 is trained with the standard environment image IMG_DAY acquired in a predetermined standard environment (daytime environment) as the learning data (S100). Furthermore, the conversion unit 42 is trained using a set of the standard environment images (e.g., IMG_DAY) acquired in a standard environment and an actual environment image (e.g., IMG_NIGHT) acquired in an environment that differs from the standard environment. (S102).

The above is the configuration of the object identification system 10. The object identification system 10 allows the object recognition unit 44 trained in the standard environment to provide high-precision object recognition based on an image acquired in an actual environment that differs from a standard environment.

For example, such an arrangement requires the object recognition unit 44 to be trained using only images acquired in the daytime without using images acquired in the nighttime (or using only a reduced number of such images acquired in the nighttime). This allows the costs required for the training to be dramatically reduced.

Usage

Figure 5:
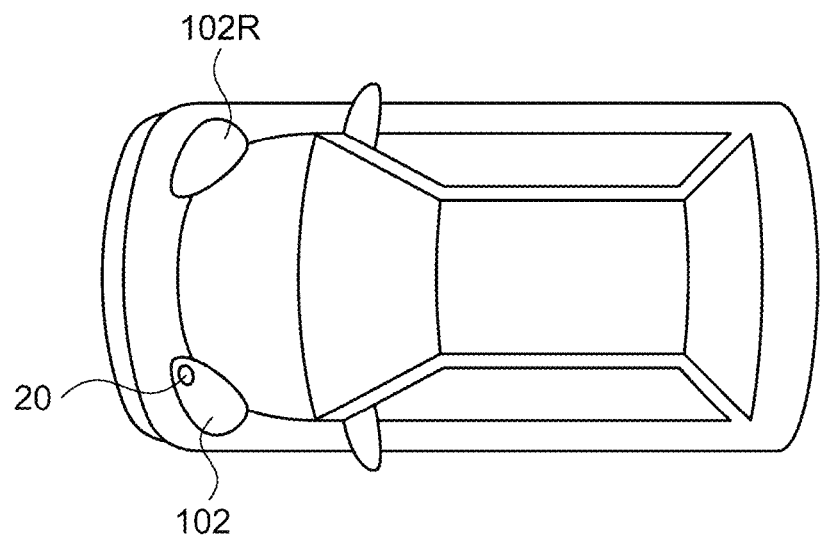
FIG. 5 is a block diagram showing an automobile including the object identification system.

FIG. 5 is a block diagram showing an automobile including the object identification system 10. An automobile 100 includes a headlamps 102L and 102R. From among the components of the object identification system 10, at least the camera 20 is built into at least one of the headlamps 102L and 102R. Each headlamp 102 is positioned at a frontmost end of the vehicle body, which is most advantageous as a position where the camera 20 is to be installed for detecting an object in the vicinity. The processing unit 40 may be built into the headlamp 102. Also, the processing unit 40 may be provided to the vehicle side. For example, from among the components of the processing unit 40, the conversion unit 42 that generates the second image IMG2 may be configured as an internal component of the headlamp 102. Also, the object recognition unit 44 may be mounted on the vehicle side.

Figure 6:
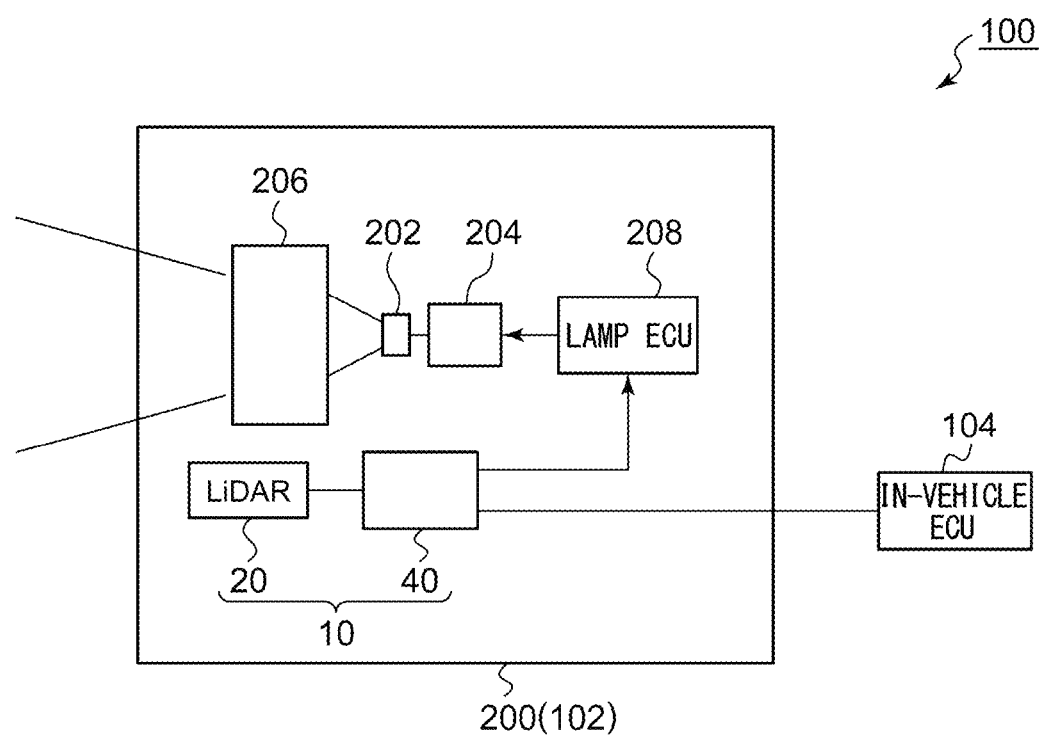
FIG. 6 is a block diagram showing an automotive lamp including the object identification system.

FIG. 6 is a block diagram showing an automotive lamp 200 including the object identification system 10. The automotive lamp 200 includes a light source 202, a lighting circuit 204, and an optical system 206. Furthermore, the automotive lamp 200 is provided with the camera 20 and the processing unit 40. The information with respect to the object OBJ detected by the processing unit 40 is transmitted to the in-vehicle ECU 104. The in-vehicle ECU may support autonomous driving based on the information thus transmitted.

Also, the information with respect to the object OBJ detected by the processing unit 40 may be used to support the light distribution control operation of the automotive lamp 200. Specifically, the lamp ECU 208 generates a suitable light distribution pattern based on the information with respect to the kind of the object OBJ and the position thereof thus generated by the processing unit 40. The lighting circuit 204 and the optical system 206 operate so as to provide the light distribution pattern generated by the lamp ECU 208.

Description has been made above regarding the present disclosure with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present disclosure. Description will be made below regarding such modifications.

Modification 1

Description has been made in the embodiment regarding an example of a difference in the environment between the daytime and the nighttime. However, the present disclosure is not restricted to such an example. In a case in which there is a large difference in the angle of view, field of view, line of sight, image distortion, or the like, between an image acquisition system including a camera (reference camera) used to acquire the learning data and the camera 20 mounted on the object identification system 10, such a difference can be regarded as a difference in the environment. In this case, the first image IMG1 acquired by the camera 20 may be converted into a second image IMG2 such that it becomes an approximation of an image as acquired by the reference camera. In this case, instead of shades, the conversion unit 42 corrects the shape of an image.

For example, in a case in which the camera 20 is built into a headlamp, in some cases, image distortion occurs due to an outer lens. On the other hand, the camera that acquires the learning data does not involve such image distortion. In this case, the conversion unit 42 may convert the first image IMG1 so as to reduce the effect of such image distortion.

Modification 2

With the embodiment, in the training of the neural network of the conversion unit 42, the neural network of the conversion unit 42 may be optimized so as to improve the recognition rate with reference to the recognition rate of the object recognition unit 44 as a parameter.

Modification 3

In addition to the first image IMG1 generated as a current frame, a past frame generated as a frame consecutive to the first image IMG1 may be input to the conversion unit 42 so as to generate the second image IMG2. By inputting multiple consecutive frames, this allows the conversion unit 42 to support conversion processing based on features that change over time.

Modification 4

Instead of the camera 20, a TOF camera or LiDAR may be employed. In this case, the output data of the LiDAR or TOF camera may be handled as image data with the distance as the pixel value. There is a difference in the output data of the distance measurement sensor (three-dimensional sensor) between rainfall, snowfall, and dense fog compared to cloudy weather or clear weather. In order to solve such a problem, the conversion unit 42 converts the output data of the distance measurement sensor into intermediate data as acquired in an environment (clear weather or cloudy weather) in which the learning data used for the training of the object recognition unit 44 was acquired. This allows the identification rate to be improved.

Modification 5

The processing unit 40 may be configured of only a hardware component using an FPGA, a dedicated Application Specific Integrated Circuit (ASIC), or the like.

Modification 6

Description has been made in the embodiment regarding the in-vehicle object identification system 10. However, the present disclosure is not restricted to such an application. For example, the object identification system 10 may be fixedly installed on transportation infrastructure such as a traffic light, traffic sign, or the like. That is to say, the present disclosure is applicable to a fixed-point observation application.

Description has been made regarding the present invention with reference to the embodiments using specific terms. However, the above-described embodiments show only an aspect of the mechanisms and applications of the present invention. Rather, various modifications and various changes in the layout can be made without departing from the spirit and scope of the present invention defined in appended claims.

What is claimed is:

1. A processing device structured to recognize an object, comprising:
    a conversion unit structured as a neural network, and structured to receive, from a camera, a two-dimensional first image captured by the camera in a first environment and convert the two-dimensional first image into a two-dimensional second image associated with a second environment different from the first environment; and
    an object recognition unit structured to identify an object based on the two-dimensional second image, wherein the object recognition unit is trained using learning image data captured under the second environment,
    and wherein the two-dimensional second image is an image to be acquired if the same scene was captured in the second environment.

2. The processing device according to claim 1, wherein the two-dimensional second image is obtained by correcting shades of the two-dimensional first image such that they are an approximation of learning data used for training of the object recognition unit.

3. The processing device according to claim 1, wherein the two-dimensional second image of the same scene as that of the two-dimensional first image is generated as an image as acquired in the same environment as an environment in which the learning data used for the training of the object recognition unit was acquired.

4. The processing device according to claim 3, wherein the learning data is acquired in daytime,
    and wherein the conversion unit converts a first image acquired in nighttime into a second image as acquired in daytime.

5. The processing device according to claim 1, wherein, in the training of the conversion unit, the neural network of the conversion unit is optimized with reference to an identification rate of the object recognition unit so as to improve the identification rate.

6. The processing device according to claim 1, wherein the conversion unit receives a plurality of consecutive frames as input.

7. An object identification system comprising:
    a camera; and
    the processing device according to claim 1.

8. An automotive lamp comprising the object identification system according to claim 7.

9. An automobile comprising:
    a camera built into a headlamp; and
    the processing device according to claim 1.

10. A processing device, comprising:
    a conversion unit structured to receive, from a camera, a two-dimensional first image captured by the camera in a first environment and convert the two-dimensional first image into a two-dimensional second image associated with a second environment different from the first environment; and
    an object recognition unit structured to process the two-dimensional second image processed by the conversion unit, and to identify the object,
    and wherein the object recognition unit is trained using a two-dimensional image captured in the second environment as learning data; and
    the conversion unit is trained using a set of a two-dimensional image captured in the second environment and a two-dimensional image captured in the first environment that differs from the second environment,
    wherein the two-dimensional second image is an image to be acquired if the same scene was captured in the second environment.

* * * * *